United States Patent
Bauer et al.

(10) Patent No.: US 9,063,837 B2
(45) Date of Patent: Jun. 23, 2015

(54) METHOD AND DEVICE FOR FAULT-TOLERANT, TIME-CONTROLLED REAL-TIME COMMUNICATION

(75) Inventors: Guenther Bauer, Vienna (AT); Stefan Poledna, Klosterneuburg (AT); Wilfried Steiner, Zistersdorf (AT)

(73) Assignee: FTS Computertechnik GmbH, Vienna (AT)

( * ) Notice: Subject to any disclaimer, the term of this patent is extended or adjusted under 35 U.S.C. 154(b) by 190 days.

(21) Appl. No.: 13/639,456

(22) PCT Filed: Apr. 7, 2011

(86) PCT No.: PCT/AT2011/000167
§ 371 (c)(1),
(2), (4) Date: Nov. 20, 2012

(87) PCT Pub. No.: WO2011/123877
PCT Pub. Date: Oct. 13, 2011

(65) Prior Publication Data
US 2013/0086432 A1    Apr. 4, 2013

(30) Foreign Application Priority Data

Apr. 7, 2010  (AT) .................................. A 557/2010

(51) Int. Cl.
*G06F 1/12*    (2006.01)
*G06F 1/14*    (2006.01)
(Continued)

(52) U.S. Cl.
CPC ............... *G06F 11/004* (2013.01); *G06F 1/14* (2013.01); *H04J 3/0688* (2013.01); *H04L 49/1523* (2013.01); *H04L 49/206* (2013.01); *H04L 49/552* (2013.01)

(58) Field of Classification Search
CPC ............... H04J 3/06; H04L 12/56; G06F 1/14
USPC ............................................ 713/400; 714/43
See application file for complete search history.

(56) References Cited

U.S. PATENT DOCUMENTS 5,269,016 A * 12/1993 Butler et al. .................... 714/6.1
7,193,994 B1 * 3/2007 Payson .......................... 370/380
(Continued)

FOREIGN PATENT DOCUMENTS

WO        2011123877 A1    10/2011

OTHER PUBLICATIONS

International Preliminary Report on Patentability for International Application No. PCT/AT2011/000167, International Filing Date Jul. 4, 2011, Search Completed Oct. 9, 2012, 8 pages.
(Continued)

*Primary Examiner* — Vincent Tran
(74) *Attorney, Agent, or Firm* — KPPB LLP

(57) ABSTRACT

The aim of the present invention is that of establishing a fault-tolerant global time in a fault-tolerant communication system of a distributed real-time system. For this purpose, a fault-tolerant message switching unit is provided, which is composed of four independent switching units. These four independent switching units jointly establish a fault-tolerant time. The terminal systems are connected to a fault-tolerant message switching unit via two independent fail-silent communication channels, so that the clock synchronization and network connections are preserved, even if a part of the fault-tolerant switching unit or of a communication channel fails.

14 Claims, 1 Drawing Sheet

(51) Int. Cl.
  *G06F 11/00* (2006.01)
  *H04J 3/06* (2006.01)
  *H04L 12/933* (2013.01)
  *H04L 12/931* (2013.01)
  *H04L 12/939* (2013.01)

(56) References Cited

U.S. PATENT DOCUMENTS

| | | | |
|---|---|---|---|
| 7,194,661 B1 * | 3/2007 | Payson | 714/43 |
| 2003/0065974 A1 * | 4/2003 | Lam et al. | 714/11 |
| 2004/0133693 A1 * | 7/2004 | Wils et al. | 709/230 |
| 2006/0215568 A1 * | 9/2006 | Smith | 370/241 |
| 2007/0230330 A1 * | 10/2007 | Dietz et al. | 370/216 |

OTHER PUBLICATIONS

International Search Report for International Application No. PCT/AT2011/000167, International Filing Date Jul. 4, 2011, Search Completed Aug. 30, 2011, Mailed Sep. 6, 2011, 3 pages.

Written Opinion for International Application No. PCT/AT2011/000167, International Filing Date Jul. 4, 2011, Search Completed Aug. 30, 2011, Mailed Sep. 6, 2011, 7 pages.

* cited by examiner

METHOD AND DEVICE FOR FAULT-TOLERANT, TIME-CONTROLLED REAL-TIME COMMUNICATION

CITED PATENTS

[1] EP 1 512 254 of May 10, 2005: Time-Triggered (TT) Ethernet.
[2] EP 2 145 431 of Apr. 7, 2008: Communication method and device for efficient and secure transmission of TT Ethernet messages
[3] U.S. Pat. No. 7,334,014 of Feb. 19, 2008: Consistent time service for fault-tolerant distributed systems.
[4] U.S. Pat. No. 7,649,912 of Jan. 19, 2010: Time synchronization, deterministic data delivery and redundancy for cascaded nodes on full duplex Ethernet networks

OTHER LITERATURE

[5] Kopetz, H. (1997). Real-Time Systems, Design Principles for Distributed Embedded Applications; ISBN: 0-7923-9894-7. Boston. Kluwer Academic Publishers.

TECHNICAL ENVIRONMENT

The present invention relates to a method and a device for fault-tolerant time-triggered communication and for establishing a fault-tolerant global time having known precision in the communication system of a distributed real-time computer system.

BACKGROUND OF THIS INVENTION

A distributed real-time system is composed of a number of processor nodes, these being the terminal systems, in which the application software runs, and a generic communication system, via which the messages of the terminal systems are exchanged with one another. A global fault-tolerant timebase having good precision must be established in distributed real-time systems so that the terminal systems can check the temporal validity of the real-time information and carry out synchronized distributed actions. Establishing a fault-tolerant global timebase requires the execution of complex synchronization algorithms. In order to relieve the terminal systems of these synchronization tasks, according to the invention the distributed fault-tolerant clock synchronization is performed in the generic communication system, so that the terminal systems can be provided with the global time using simple fault-tolerant master-slave synchronization (refer to textbook [5], section 3).

Many of the known clock synchronization methods, such as the methods published in the cited patents [1] to [4], use the clocks of the terminal systems to establish a global time. So as to achieve this, complex synchronization algorithms must be executed in the terminal systems. According to the present invention, a fault-tolerant time is not established in the terminal systems, but in the communication system. For this purpose, a fault-tolerant switching unit (fault-tolerant switch) is provided, which contains four independent switching units, each switching unit forming an autonomous fault containment unit (FCU). These four switching units together establish a fault-tolerant timebase by exchanging messages. Two of the four switching units form a respective switch pair, whereby the fault-tolerant switching unit contains two switch pairs. Each of the two switching units of a switch pair periodically transmits a synchronization message to a comparator, which forwards a synchronization messages to a terminal system only if both synchronization messages received arrive almost simultaneously and identical in terms of content. Because the fault-tolerant switching unit contains two switch pairs, this method tolerates an arbitrary fault in a switch pair.

The exact procedure of the novel method for fault-tolerant communication and fault-tolerant clock synchronization will be described in more detail hereafter based on the figures.

The object of the invention is achieved by a method for fault-tolerant clock synchronization and for fault-tolerant time-triggered real-time communication using a number of terminal systems and one or more fault-tolerant switches, which are respectively connected via at least two communication channels, wherein each fault-tolerant switch contains a first and a second switch pair, and the first switch pair contains a first and a second switch and the second switch pair contains a third and a fourth switch, and wherein each of the four switches is connected to the remaining three switches via communication channels, and wherein the four switches establish an internal global fault-tolerant timebase having known precision via the communication channels using a known message-based internal fault-tolerant synchronization algorithm, and wherein a plurality of terminal systems can be connected to the two switch pairs, respectively, via a comparator associated with a terminal system, and wherein a first terminal system transmits a respective copy of a message to be transmitted to a terminal system to the first switch pair via the first communication channel and to the second switch pair via the second communication channel, and wherein the first comparator transmits the arriving message to the first switch via a communication channel and to the second switch via a communication channel, and wherein the third comparator transmits the arriving message to the third switch via a communication channel and to the fourth switch via a communication channel, and wherein the four switches switch the arriving messages and, if a message is addressed to the second terminal system, the switches transmit a respective copy of the message to the second comparator associated with the second terminal system via communication channels, and wherein the second comparator opens a time window having the duration D immediately after the temporally first message has arrived and, if during this interval D no second copy of this message arrives at the second comparator, the second comparator discards the message and, if during this interval D a second copy of the message arrives, the second comparator compares the two messages bit by bit and, if the comparator uncovers a bit error, it interrupts the transmission of the message and discards the message and, if all bits of this message are identical, it transmits the entire message to the second terminal system via the second communication channel, and wherein the second switch pair proceeds analogously and thus two checked copies of a message arrive at the terminal system in the fault-free case and, if one of the two switch pairs is faulty or detects an error and discards the message, a correct message still arrives at the second terminal system, and wherein the fault-tolerant switch, in addition to the messages received from the terminal systems, periodically transmits two synchronization messages generated in the switch to all connected terminal systems, wherein a synchronization message is transmitted by the first switch pair and the other synchronization message is transmitted by the second switch pair, and wherein the time at which a synchronization message arrives at a terminal system corresponds to the time contained in the data field of the synchronization message.

Advantageously, the two switch pairs are arranged spatially separate from each other.

In one variant of the method, signed messages are used as part of the clock synchronization.

In a further variant, after receiving an external synchronization message, a fault-tolerant switch adapts the internal synchronized time thereof to the time predetermined by the external synchronization message.

The switches advantageously delay the messages only by several bit lengths and switch them to the comparator using the cut-through method.

In one variant of the invention, the comparators delay the messages only by several bit lengths and switch these to the terminal system using the error-free cut-through method.

The terminal systems connected to a fault-tolerant switch advantageously transmit a mixture of event-driven, bandwidth-limited or time-triggered messages.

A priori planning information about the allowed temporal behavior of the terminal systems is located into the switches, so that a switch can detect a faulty temporal behavior of a terminal system.

The a priori planning information for the switch is advantageously provided with an electronic signature of the sender.

It is further advantageous if the a priori planning information for the switch is encrypted.

In one variant of the invention, the a priori planning information can be dynamically altered during operation.

The comparators are advantageously operated in the multiplex method.

In a further variant of the invention, the different signal propagation times on the communication channels are compensated for by the switch pairs.

The messages produced and consumed by the terminal systems advantageously correspond to the Ethernet standard.

The object of the invention is further achieved by a device for fault-tolerant time-triggered real-time communication, composed of one or more fault-tolerant switches, which are each connected via at least two communication channels, wherein each fault-tolerant switch contains two switch pairs, and the first switch pair contains a first and a second switch and the second switch pair contains a third and a fourth switch, and wherein each of the four switches is connected to the remaining three switches via the communication channels, and wherein a plurality of terminal systems can be connected to the two switch pairs via a respective dedicated comparator which is associated with the terminal system, and wherein one or more of the aforementioned method steps are implemented in this device.

The aim of the present invention is that of establishing a fault-tolerant global time in a fault-tolerant communication system of a distributed real-time system. For this purpose, a fault-tolerant message switching unit is provided, which is composed of four independent switching units. These four independent switching units jointly establish a fault-tolerant time. The terminal systems are connected to a fault-tolerant message switching unit via two independent fail-silent communication channels, so that the clock synchronization and network connections are preserved, even if a part of the fault-tolerant switching unit or of a communication channel fails.

BRIEF DESCRIPTION OF THE FIGURES

The aim described above and other new properties of the present invention will be described based on the accompanying drawings.

DESCRIPTION OF AN IMPLEMENTATION

A possible implementation of the novel method will be described hereafter based on an example containing three switches and a plurality of terminal systems. This example shows one specific implementation among many possible implementations of the method described in the claims.

Figure 1:
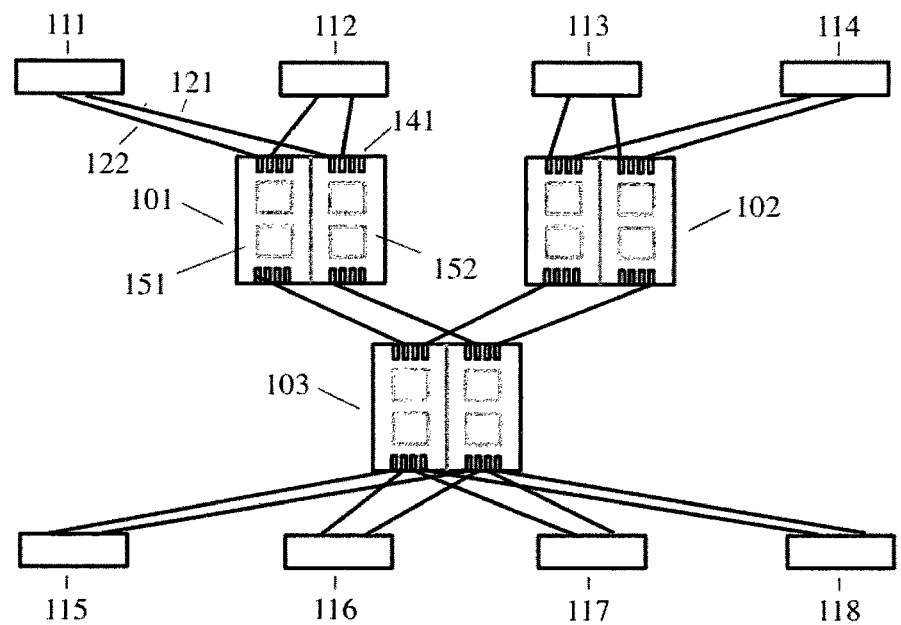
FIG. 1 shows an example of the structure of a fault-tolerant communication system, which is composed of several fault-tolerant switching units.

FIG. 1 shows a configuration containing three fault-tolerant switching units 101, 102 and 103, hereafter referred to as switches, and eight terminal systems 111 to 118. One terminal system is a front-end computer, in which a part of a distributed real-time application runs. The three switches 101, 102 and 103 are connected among each other by means of two communication channels 121 and 122, respectively, because the failure of one communication channel must be tolerated. Each switch, for example the switch 101, contains two switch pairs 151 and 152, with each switch pair consisting of two switches. Each switch forms an autonomous fault containment unit (FCU). The terminal system 111 is connected to the left switch pair 151 of the fault-tolerant switch 101 via the communication channel 121 and to the right switch pair 152 via the communication channel 122. Analogously, the remaining terminal systems 112 to 118 are each connected to the one switch pair of a fault-tolerant switch via one communication channel and to the other switch pair via the other communication channel.

Figure 2:
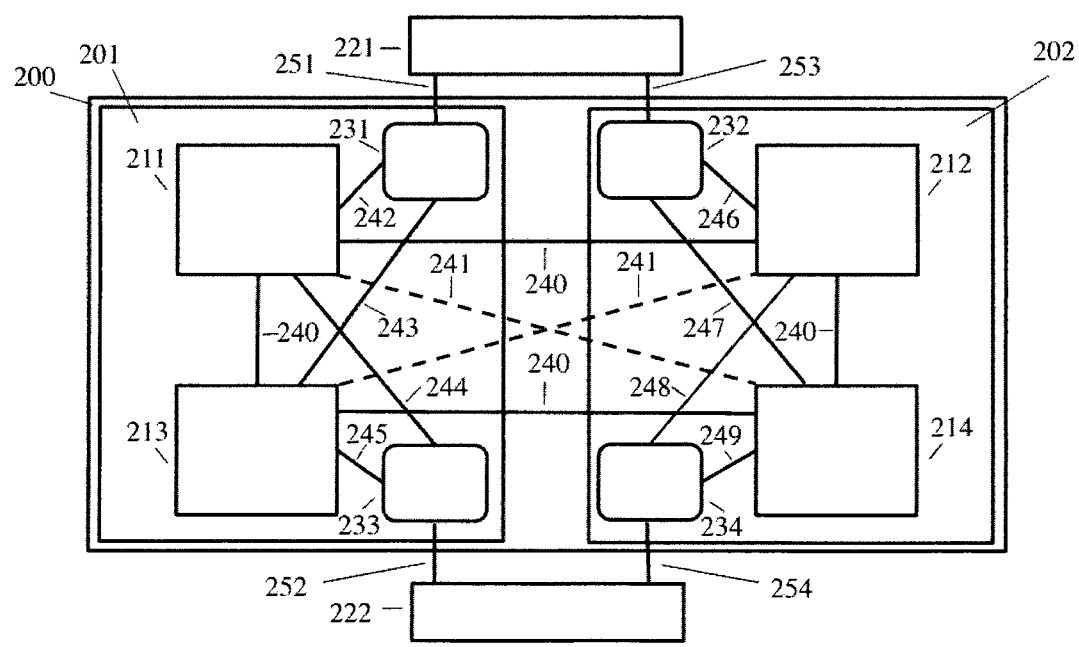
FIG. 2 shows the inner design of a fault-tolerant switching unit.

FIG. 2 shows the inner design of a fault-tolerant switch 200. The number n of terminal systems which can be connected to a switch is not defined by the present invention and depends on the concrete design of the fault-tolerant switch. Typically, n ranges between 8 and 16. For example, four end terminals can be connected in the fault-tolerant switch 101 both on the upper face and on the lower face, respectively. To simply FIG. 2, only two terminal systems, these being the first terminal system 221 and the second terminal system 222, are shown in the fault-tolerant switch 200.

The fault-tolerant switch 200 is composed of the two switch pairs 201 and 202. The first switch pair 201 is composed of the two (non-fault-tolerant) switches 211 and 213, these being the first switch 211 and the second switch 213, and the comparators 231 and 233, these being the first comparator 231 and the second comparator 233. The second switch pair 202 is composed of the two (non-fault-tolerant) switches 212 and 214, these being the third switch 212 and the fourth switch 214, and the comparators 232 and 234, these being the third comparator 232 and the fourth comparator 234.

Each terminal system is thus associated with two comparators, one of the right and one of the left switch pair. According to the invention, the comparators can also be multiplexed, so that in each case a comparator having n inputs/outputs 251 and 252 to n terminal systems 221 and 222 is located in a switch pair. Each of the four switches 211, 212, 213, 214 forms an autonomous fault containment unit. The four switches 211, 212, 213, 214 are connected to each other via communication channels 240, 241.

Using the example of the first switch 211: The first switch 211 is either connected to the horizontally and vertically adjacent switches, in this case these are the second switch 213 and the third switch 212, via the communication channels 240, and to the fourth switch 214 via these switches. Or the first switch 211 is connected to the fourth switch 214 via the communication channel 241, and to the remaining switches via this switch or appropriate communication channels 240, 241. In addition, as shown in FIG. 2, the first switch 211 can be connected to the horizontally and vertically adjacent switches (the second switch 213 and third switch 212) via the communication channels 240 and to the fourth switch 214 via a communication channel 241.

Thus, at least the communication channels 240 must be provided, while the communication channels 241 can be dispensed with (see below).

Internal synchronization messages are periodically exchanged via these communication channels 240 and 241 so as to establish an internal global fault-tolerant time having the known precision P. This is done by means of a fault-tolerant message-based clock synchronization algorithm for the internal clock synchronization, as is explained in section 3 of the textbook [5], for example.

The two connections 241 are not required according to the invention if the internal synchronization messages are provided with an electronic signature of the sender. In security-critical applications, it is advantageous to arrange the two switch pairs 201 and 202, which form a fault-tolerant switch, spatially remote from each other so as to tolerate faults that occur at one location in space (spatial proximity faults). In such a case, it is advantageous to reduce the number of connecting lines between the switch pairs to the two channels 240.

A selected switch, for example switch 103 in FIG. 1, or a terminal system equipped with a time source, for example a GPS time receiver, can predetermine an external timebase to the connected switches. This is done via external synchronization messages containing the external time. After such an external synchronization message is received, the receiving fault-tolerant switch must adapt the internal time synchronization thereof to the externally predetermined time. If the external time source fails, the fault-tolerant internal synchronization algorithm maintains the global time. The external time source can also be used to dynamically adapt the clock pattern of the switches 211, 212, 213, 214 to the pattern of the external time.

If the first terminal system 221 intends to transmit a message to the second terminal system 222, this message is at the same time transmitted to the first comparator 231 in the first switch pair 201 via the first communication channel 251 and to the third comparator 232 in the second switch pair 202 via the third communication channel 253. The format of this message can correspond to a particular standard, for example the widely used Ethernet standard or the AFDX standard, or any other standard which specifies that the address information must be contained in the header of the message, to allow the messages to be switched by the switches 211, 212, 213, 214 using the fast cut-through method.

The messages can be transmitted by the first terminal system 221 in a time-triggered, bandwidth-limited or event-driven manner. In the case of time-triggered messages, the switches 211, 212, 213, 214 can be supplied a priori with planning information which specifies the allowed times of transmission of a time-triggered message by a terminal system. A time-triggered message that is transmitted by the first terminal system 221 at the wrong time can then be detected by the switches 211, 212, 213, 214 and discarded. In the case of bandwidth-limited messages, the switches 211, 212, 213, 214 can be supplied a priori with planning information which specifies the allowed bandwidth for transmitting bandwidth-limited messages. If the bandwidth-limited messages transmitted by the first terminal system 221 go beyond the allowed bandwidth, the switches 211, 212, 213, 214 can refuse to accept further messages.

The a priori planning information, which is transmitted by a draft system to the switches 211, 212, 213, 214 before transmitting a message, can be provided with an electronic signature, so that the switches 211, 212, 213, 214 can examine whether this information originates from an authorized draft system. As an alternative, the planning information can be transmitted in encrypted form. The a priori planning information can be dynamically altered during operation by transmitting a new message containing the new planning information and the time as of which this new planning information is to be applied.

The processing of messages in the first switch pair 201 will be described hereafter in detail. A message arriving from the first communication channel 251 in the first comparator 231 is forwarded by the first comparator 231 to the first switch 211 via the communication channel 242 and to the second switch 213 via the communication channel 243 for switching purposes. Because of the address information contained in the header of a message, the message is forwarded by the first switch 211 via the communication channel 244, and by the second switch 213 via the communication channel 245, to the addressed comparator, which in the example is the second comparator 233. As soon as the temporally first message addressed to the second comparator 233 arrives from one of the two switches 211 or 213 at the second comparator 233, the second comparator 233 opens a time window having the a priori predetermined duration D. If during this time window D the temporally second message from the other switch of the first switch pair 201 does not arrive, the comparator discards the first message and subsequently also the second message (if it ever arrives). If during this time window D the second message from the other switch of the first switch pair 201 arrives, the second comparator 233 compares the two messages bit by bit and promptly forwards it to the addressed (second) terminal system 222 via the second communication channel 252. This comparison of the two messages can be carried out using the error-free cut-through method, which is to say the arriving bit streams are delayed only briefly in the second comparator 233, continuously compared and immediately forwarded if the bit comparison is correct. In the event of a fault, the bit stream to the (second) terminal system 222 is aborted. Because every message contains a CRC field, the (second) terminal system 222 is able to detect an aborted message and discard it.

The duration of the necessary delay of a message in the second comparator 233 depends on the precision P of the clock synchronization, which is substantially defined by the duration of the synchronization period and the quality of the oscillators used. The number of bits that must be stored in the comparator depends on the precision P and the bandwidth of the data transmission.

The comparators 231, 232, 233, 234 are designed so that a comparator cannot store a complete message and no comparator has information as to how to form a correct CRC field of a message. It is therefore extremely unlikely that a faulty comparator can generate a message that is syntactically correct, but incorrect in terms of content, or that it can transmit a message that is syntactically correct, but incorrect in terms of content at a time that is different than that which is produced by the first 211 or third 212 switch. The first switch pair 201 thus forwards a syntactically correct message to the (second) terminal system 222 via the second communication channel 252 only if all four subsystems 231, 211, 213 and 233 function without fault and the message transport over the channels 251, 242, 243, 244, 245 and 252 is carried out without fault. The first switch pair 201 thus implements the fail-silent abstraction at the second communication channel 252: either it produces messages which are correct in the value range and in the time range, or it produces no messages. The second switch pair 202 functions analogously to the first switch pair 201.

In addition to the messages received from the terminal systems, the fault-tolerant switch 200 periodically transmits two internally generated synchronization messages to all connected terminal systems, wherein almost simultaneously a synchronization message is transmitted from the left (first) switch pair 201 via the first communication channel 251 and second communication channel 252 and a second synchronization message is transmitted from the right (second) switch pair via the third communication channel 253 and fourth communication channel 254. The time at which a synchronization message arrives at a terminal system corresponds to the time which is contained in the data field of the synchronization message. Because the signal propagation times on the communication channels 251, 252, 253, 254 are different due to different durations of these signal propagation times on the communication channels, a correction of the arrival time of a synchronization message at the terminal system may be required. This correction can be made either in the terminal system or in the switch pairs 201, 202.

In the fault-free case, the (second) terminal system 222 thus receives two correct synchronization messages, one via the (second) communication channel 252 and the other via the (fourth) communication channel 254, the arrival times of which differ by no more than the precision P. If a fault occurs in one switch pair, the (second) terminal system 222 still receives a correct synchronization message.

Economic Advantages

Using standard components, which is to say components that do not possess the self-checking property, the present invention allows a fault-tolerant timebase and a fault-tolerant switch which tolerates an arbitrary error in a fault containment unit (FCU) to be established. FIG. 2 shows the following subsystems of the fault containment unit: the four switches 211, 212, 213, 214 and the four comparators 231, 232, 233, 234. The last subsystem deserves special attention, this being the comparator, which is arranged before the output of a message to the terminal system. Because of the afore-described design measures it can be excluded that a faulty comparator produces a message that is syntactically correct, but incorrect in terms of content, even though the comparator itself is not designed to be a self-checking checker.

The design according to the invention of a fault-tolerant switch which contains fault-tolerant clock synchronization results in the following additional key economic advantages:
  Incorrect results are prevented from being produced in the event of a fault. This property is particularly important in security-critical systems.
  By tolerating a fault, the reliability of a fault-tolerant switch compared to a non-fault-tolerant switch is significantly improved.
  The clock synchronization algorithm must be developed, tested and certified only once and can be utilized in a variety of applications.
  By shifting the fault-tolerant clock synchronization from the terminal systems to the communication system, the terminal systems become considerably more simple and cost-effective.

A generic solution of the clock synchronization in the communication system can be implemented very cost-effectively in a VLSI chip.

The invention claimed is:

1. A method for fault-tolerant clock synchronization and for fault-tolerant time-triggered real-time communication using a number of terminal systems and one or more fault-tolerant switches, which are respectively connected via at least two communication channels, characterized in that each fault-tolerant switch contains a first switch pair and a second switch pair, wherein the first switch pair contains a first switch and a second switch and the second switch pair contains a third switch and a fourth switch, and wherein each of the first through fourth switches are connected to the remaining three switches via a communication channel, and the first through fourth switches establish an internal global fault-tolerant timebase having a known precision (P) via the communication channel using a known message-based internal fault-tolerant synchronization algorithm, and wherein each of a plurality of terminal systems is connected to the first switch pair via a first comparator associated with a particular terminal system and to the second switch pair via a second comparator associated with the particular terminal system, said method comprising:
    receiving a copy of a message transmitted by a first terminal system via a first communication channel in the first switch pair wherein the first comparator associated with the first terminal system in the first switch pair transmits a copy of the message to the first switch via a first communication channel and a copy of the message to the second switch via a second communication channel in the first switch pair;
    receiving a copy of the message the second switch pair via the second communication channel wherein the second comparator associated with the first terminal system in the second switch pair transmits a copy of the message to the third switch via a first communication channel and a copy of the message to the fourth switch via a second communication channel in the second switch pair;
    wherein the first through fourth switches switch the copy of the message;
    transmitting a copy of the message from each of the first switch and the second switch to a first comparator associated with a second terminal system via second and third communication channels;
    transmitting a copy of the message from each of the third and fourth switches to a second comparator associated with the second terminal system via third and fourth communication channels;
    opening a time window having a duration, D, in each of the comparators associated with the second terminal system immediately after a temporally first copy of the message arrives;
    determining whether a temporally second copy of the message arrives in each of the comparators associated with the second the interval D;
    discarding the temporally first message if the temporally second copy of the message does not arrive during the interval;
    comparing the temporally first and second messages bit by bit in a comparator associated with the second terminal system in response to the temporally second message arriving during interval, D, in the comparator;
    interrupting the transmission of the copy of the message by a comparator associated with the second terminal system if the comparator detects a bit error between the temporally first and second messages;

transmitting the copy of the message from a comparator associated with the second terminal system to the second terminal system via a communication channel if all of the bits are identical in the temporally first and second messages wherein two checked copies of the message arrive at the second terminal system in the fault-free case and, if one of the first and second switch pairs is faulty or detects an error and discards the message, a correct message still arrives at the second terminal system; and periodically transmitting two synchronization messages generated in a fault-tolerant switch to all connected terminal systems, wherein a first synchronization message is transmitted by the first switch pair and a second synchronization message is transmitted by the second switch pair, and wherein the time at which a synchronization message arrives at a particular terminal system corresponds to the time contained in the data field of the synchronization message.

2. The method according to claim 1, characterized in that the first and second switch pairs are arranged spatially separate from each other.

3. The method according claim 1, characterized in that signed messages are used as part of the clock synchronization.

4. A method according to claim 1, further comprising:
receiving an external synchronization message in a fault tolerant switch; and
adapting an internal synchronized time of the fault tolerant switch to the time predetermined by the external synchronization message.

5. A method according to claim 1, characterized in that the first through fourth switches delay a message by a few bit lengths and transmit the message to the first and second comparators associated with one of the terminal systems using the cut-through method.

6. A method according to claim 1, characterized in that the first and second comparators associated with each of the terminal systems delay a message by a few bit lengths and transmit the message to the associated terminal system using the error-free cut-through method.

7. A method according to claim 1 further comprising transmitting a mixture of event-driven, bandwidth-limited, and time-triggered messages from one of the terminal systems connected to the fault tolerant switch.

8. A method according to claim 1, characterized in that a priori planning information about the allowed temporal behavior of a particular terminal system is loaded into the first through fourth switches that one of the first throught fourth switches can detect a faulty temporal behavior of the particular terminal system.

9. The method according to claim 8, characterized in that the a priori planning information for one of the first through fourth switches can be provided with an electronic signature of the sender.

10. The method according to claim 8, characterized in that the a priori planning information for the one switch is encrypted.

11. A method according to claim 8, characterized in that the a priori planning information can be dynamically altered during operation.

12. A method according to claim 1, characterized in that the first and second comparators associated with each terminal system are operated in the multiplex method.

13. A method according to claim 1, characterized in that different signal propagation times on the communication channels are compensated for by the first and second switch pairs.

14. A method according to claim 1, characterized in that messages produced and consumed by the terminal systems correspond to the Ethernet standard.

* * * * *